(12) United States Patent  (10) Patent No.: US 7,021,308 B2
Caruso  (45) Date of Patent: Apr. 4, 2006

(54) BUILT-IN, RETRACTABLE COUNTERTOP/COOK TOP APPLIANCES/UTENSILS

(76) Inventor: Steven Jerome Caruso, 862 Pine Hill Dr., Antioch, IL (US) 60002

( * ) Notice: Subject to any disclaimer, the term of this patent is extended or adjusted under 35 U.S.C. 154(b) by 654 days.

(21) Appl. No.: 09/870,194

(22) Filed: Sep. 29, 2001

(65) Prior Publication Data

US 2002/0014484 A1  Feb. 7, 2002

Related U.S. Application Data

(60) Provisional application No. 60/207,770, filed on May 30, 2000.

(51) Int. Cl.
*F24C 15/10*  (2006.01)

(52) U.S. Cl. ............... 126/211; 312/322; 312/236; 108/50.13; 219/521

(58) Field of Classification Search ............... 126/211, 126/299 R, 299 D, 37 R, 19 M; 312/236, 312/322, 350, 223.1; 108/13, 50.13, 90; 219/521, 520; 99/393
See application file for complete search history.

(56) References Cited

U.S. PATENT DOCUMENTS

| | | | |
|---|---|---|---|
| 1,341,994 A | | 6/1920 | Nelson |
| 1,972,628 A | * | 9/1934 | Lindemann et al. ........ 312/322 |
| 2,015,295 A | | 9/1935 | Steingruber |
| 2,222,960 A | * | 11/1940 | Strachan .................. 312/322 |
| 2,568,276 A | | 9/1951 | Eggleston |
| 2,850,613 A | | 9/1958 | McCormick |
| 2,882,382 A | | 4/1959 | Woxman |
| 2,944,540 A | | 7/1960 | Littell, Jr. |
| 3,051,819 A | | 8/1962 | Smith |
| 3,221,137 A | | 11/1965 | Madden |
| 3,224,743 A | | 12/1965 | Freedman et al. |
| 3,378,324 A | * | 4/1968 | Earle ..................... 312/322 |
| 3,790,750 A | | 2/1974 | Giannini |
| 4,237,856 A | | 12/1980 | Trombatore |
| 4,349,713 A | | 9/1982 | Marsen |
| 4,501,260 A | * | 2/1985 | Grace ................... 126/299 R |
| 4,568,132 A | | 2/1986 | Watt |
| 4,620,476 A | | 11/1986 | Brym |
| 4,645,905 A | | 2/1987 | Ming |
| 4,814,571 A | | 3/1989 | Bowen et al. |
| 4,934,337 A | | 6/1990 | Falk |
| 5,127,721 A | | 7/1992 | Inden |

(Continued)

OTHER PUBLICATIONS

Auton Motorized Systems Web site Page: http://auton.com/content/profile/html.

(Continued)

*Primary Examiner*—Josiah C. Cocks

(57) ABSTRACT

A device and method for the storage and retrieval of a variety of cooking utensils is disclosed. The invention may include a sleeve, can or tracking system that is capable of receiving and storing and dispensing a stand alone appliance, or a kitchen utensil that is to be used on another kitchen appliance such as a stovetop/hob. The device may also include a latching system for securing the appliance/appliance carrier or utensil in its stored position. The device may be used with existing appliances and utensils as an appliance/utensil carrier or incorporate its own proprietary appliance(s) or utensil(s). This new and novel product or system for the storage and retrieval of food preparation appliances, allows the workplace to remain uncluttered, and at the same time allows the user ready access to the appliances, devices or utensils when desired. Additionally, the appliances are stored in a more efficient manner than is currently available.

20 Claims, 17 Drawing Sheets

U.S. PATENT DOCUMENTS 5,533,797 A     7/1996    Gelber
5,793,021 A * 8/1998    Walton ........................ 126/211
5,945,024 A     8/1999    Fukunga et al.
5,955,795 A     9/1999    Beer
5,992,026 A    11/1999    Hlava

OTHER PUBLICATIONS http://www.auton.com/content/profile.html.
http://www.auton.com/content/gallery/appliance.html.
http://www.auton.com/content/gallery/table2.html.

* cited by examiner

BUILT-IN, RETRACTABLE COUNTERTOP/COOK TOP APPLIANCES/UTENSILS

This application claims the benefit of U.S. Provisional Application No. 60/207,770, filed May 30, 2000.

FIELD OF THE INVENTION

The present invention relates generally to a novel way to store and use cooking appliances normally used on a countertop or those that are often integrated into a cook top or hob. It also relates generally to a novel way to store and use separate cooking utensils normally used on a cook top or hob.

BACKGROUND OF THE INVENTION

In the art of cooking appliances it is known to build in appliances into the surrounding cabinetry and countertops. These systems generally involve making the cabinetry accommodate the appliance, while leaving an exposed side or surface in an in-use position for the operator. It is also common to provide separate cooking utensils that are to be used on an appliance such as a cook-top hob.

SUMMARY OF THE INVENTION

A typical kitchen or other workplace today is comprised of many tools that aid in cooking a variety of ways. Pots, pans and other units intended for use in conjunction with a cook top or oven are commonplace and numerous. As such, the storage and retrieval of such devices has become a major concern.

There are also specialty stand-alone devices that are to be used on a counter top. These include, but are not limited to, countertop grills, griddles, spice racks, food containers such as flour containers, warming plates, can openers, toasters, toaster ovens, mixers, and coffeemakers. For the purpose of this application we will refer to all of the aforementioned as well as any other contemplated devices as food preparation appliances, devices, utensils or tools. The issue with many of these devices is that although their function is desired, they may or may not be used that frequently. And so the problem exists that when they are not in use they are using valuable counter space. The consumer may opt to store the units in cabinetry, however, usually the units are heavy, and constructed (multi-piece) in such a way as to not be conducive to the most efficient form of storage e.g. on their side. So they do not use the cabinetry space efficiently. Again, retrieval of the units when they are to be used is less than optimal.

There are also built-in appliances (usually cook tops/hobs) that are modular in nature allowing the user to detach a particular unit such as a hob and replace it with another specialty unit such as a grill or griddle. As, previously stated, the storage and retrieval of such devices has become a major concern. The shortcomings of these units parallel those of the tabletop/countertop units.

To address these issues, many consumers have opted to simply add additional, traditional built-in countertop units throughout the kitchen. This has made it so that these units are readily available and have also addressed the desire for a decentralized cooking zone or kitchen. There has also been a trend towards decentralizing and using these types of appliances in areas other than kitchens. Often warming plates, and other such food related appliances are used in dining rooms, conference rooms and the like. Even patios, decks and other outdoor areas are being outfitted with such appliances like never before. The problem with this approach is that it uses valuable counter/work-surface space for devices that may only be occasionally needed. In many cases this also is undesirable aesthetically. To counter this, manufacturers have resorted to making covers for the units, which is only a marginal improvement in aesthetics, and no improvement as far as regaining workspace.

This invention addresses all of these concerns and creates a new and novel solution to an old problem. The invention consists of a sleeve, can or tracking system that is capable of receiving and storing and dispensing of a stand alone appliance, or a kitchen utensil that is to be used on another kitchen appliance such as a stovetop/hob.

BRIEF DESCRIPTION OF DRAWINGS

Referring now to the figures.

The following reference characters are used in the drawings to refer to the parts of the present invention. Like reference characters indicate like or corresponding parts in the respective views.

Figure 1:
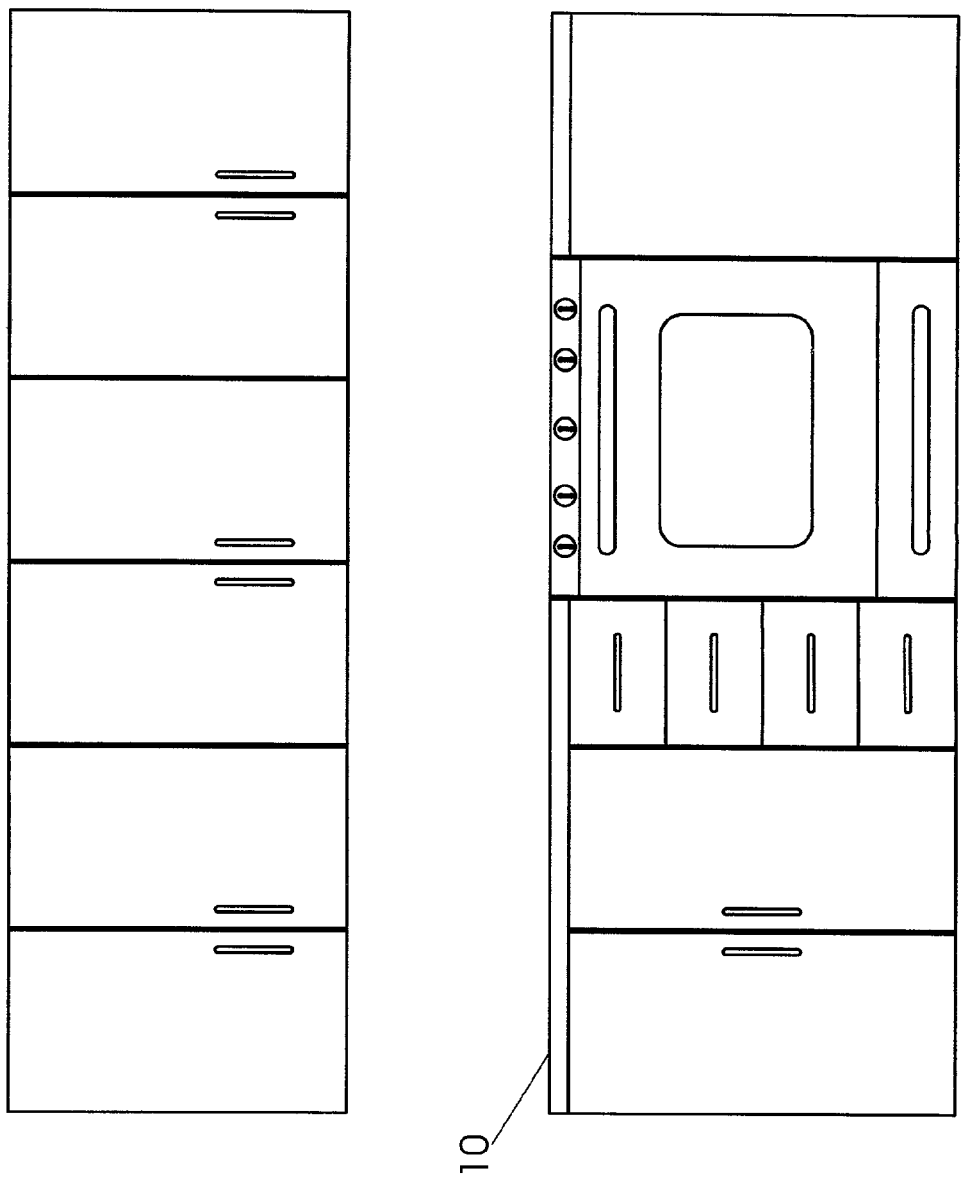
FIG. 1 is a schematic front elevational view of a typical kitchen arrangement without the invention.

10 countertop/work-surface
12 top face of appliance/utensil or optionally a displaceable cover-plate
14 cooking surface of one proposed appliance
16 cover or downdraft vent cover/opening
18 mounting sleeve/tracking system
20 trim lip
22 fixed guide wheel/guidance surface
24 rear guide wheel/guidance surface
26 pivot point of 24
28 potential sites for clean-out access hatch
30 electrical plug outlet
32 electrical conduit
34 guide rib
36 electrical plug
38 electrical outlet
40 cover plate
42 hinge/pivot point
44 proposed appliance

DETAILED DESCRIPTION OF THE INVENTION

While the invention will be described in connection with several preferred embodiments, it will be understood that the invention is not limited to these embodiments. On the contrary, the invention includes all alternatives, modifications, and equivalents as may be included within the spirit and scope of the forthcoming claims.

Referring first to FIGS. 1–15 One embodiment of the present invention is illustrated. In the illustrations a kitchen is used to demonstrate the invention. Also, the illustrations use a griddle-appliance to illustrate the basic elements of the invention.

Additionally, the appliance is constructed as part of the invention. These specific conditions do not have to exist though, any appliance used on a countertop in any type of work place would suffice, such as but not limited to grills, stir fry pans, toasters, pot/pan burners, coffeemakers, as well as other forms previously mentioned. Likewise, such products could be produced either as part of the invention, or they could be purchased separately from differing manufacturers and simply used in conjunction with the present invention. Referring to FIG. 1 a front view of typical wall of a kitchen is illustrated. Figure two is a top view of figure one. These views are for perspective of an installation lacking the present invention.

Figure 2:
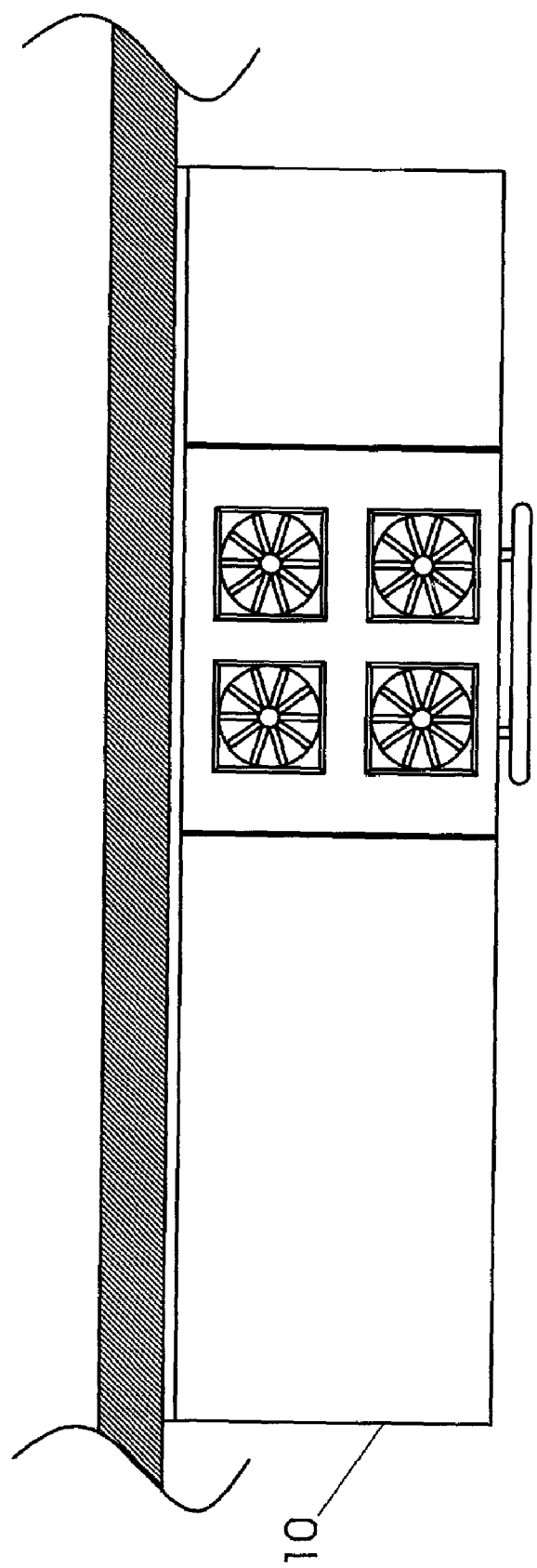
FIG. 2 is a schematic top elevational view of the typical kitchen arrangement found in FIG. 1.
Figure 3:
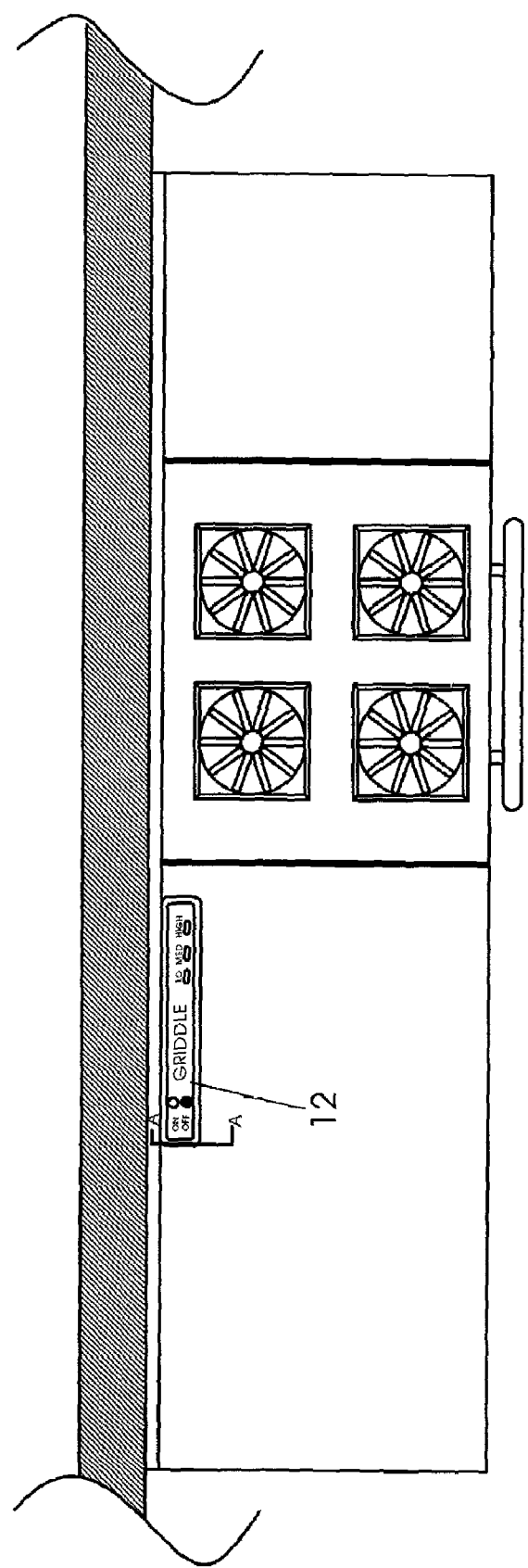
FIG. 3 is a schematic top elevational view of the typical kitchen arrangement with one embodiment of the invention in place, in an out of use position.

FIG. 3 is substantially the same top view as FIG. 2, however this represents an installation with one embodiment of the invention in an out of use position. The top face, 12, of one proposed appliance can be seen. An alternate form is that 12 would represent a cover that could flip up, slide sideways, slide into the sleeve 18, or move otherwise to enable the appliance to move into a usable position, and yet cover and conceal the appliance when it is in an out-of use position.

Figure 4:
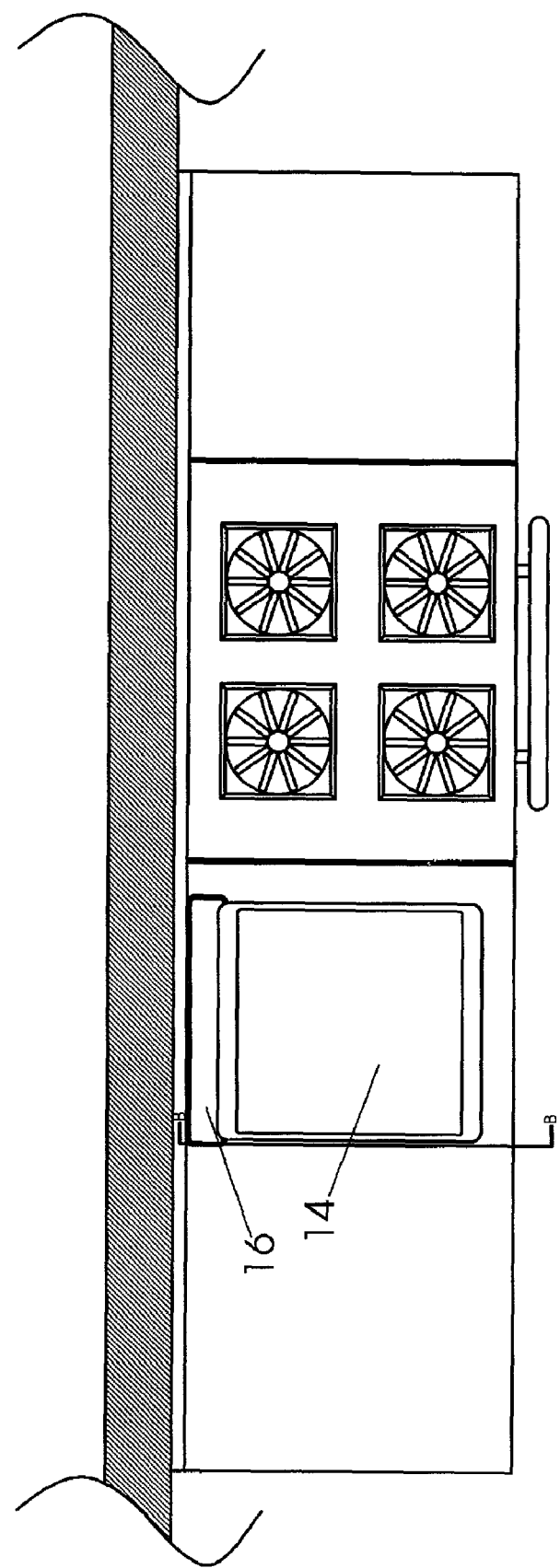
FIG. 4 is a schematic top elevational view of the typical kitchen arrangement with one embodiment of the invention in place, in an in use position.

FIG. 4 is substantially the same top view as FIG. 3; however, the appliance is now in an in-use position. Proposed modes of operations are as follows: the user could press a release catch, button or switch, which would eject the appliance via a biased force a percentage of its vertical length. In the case of a separate cover, this could open simultaneously, or as a separate operation. The user could then simply grasp the appliance, moving it to its in-use position. An alternate to this is to replace the pushbutton catch release with one similar to those commonly found on furniture doors. In this scenario the user would push downward on the appliance, which would release the internal catch similarly allowing the appliance to eject via a biased force a percentage of its vertical length. Again, the user could then simply grasp the appliance, moving it to its in-use position. Alternately, the unit could be moved into its final position (as opposed to a percentage of its length) by the same biased force. So, the unit could be moved into position by a separate motor, spring or other biasing force, on command from a user.

Figure 5:
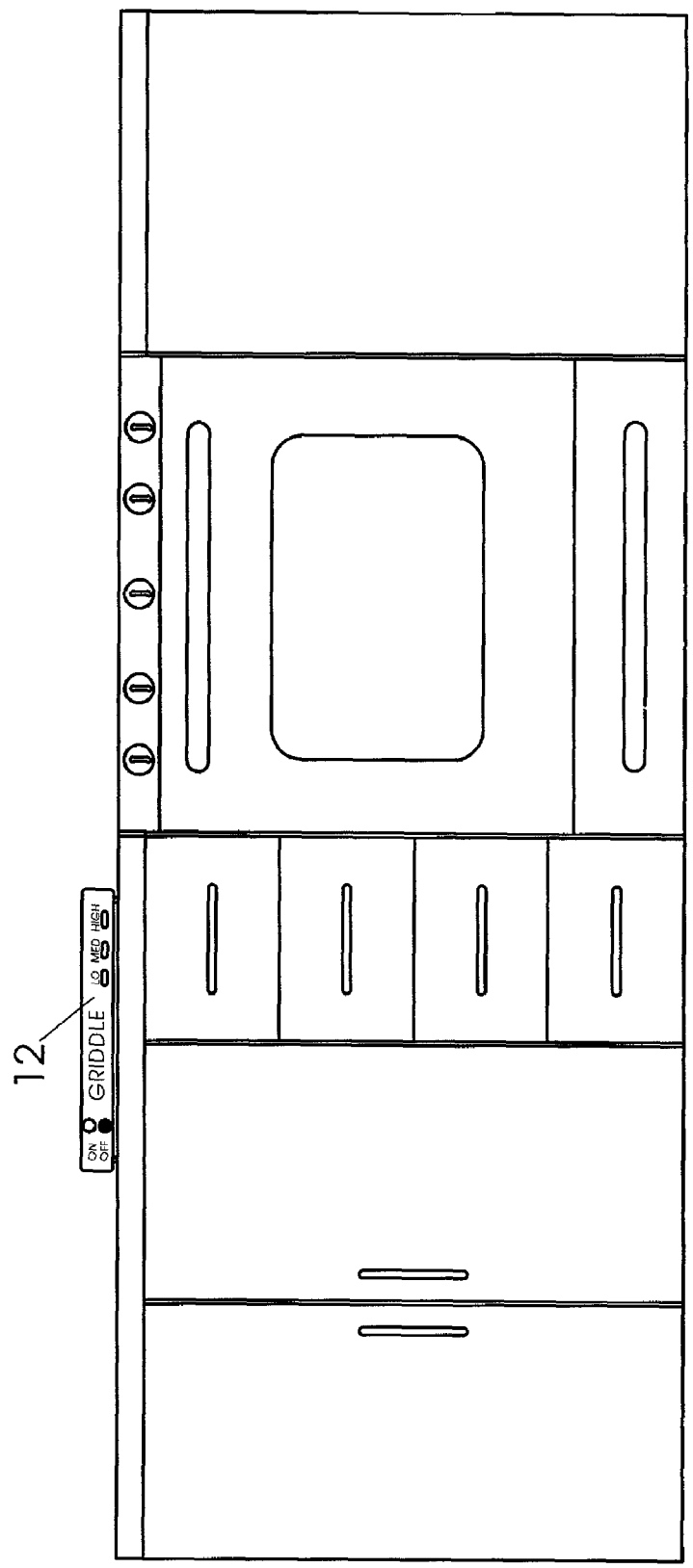
FIG. 5 is a schematic front elevational view of the typical kitchen arrangement with one embodiment of the invention in place, in an in use position.

FIG. 5 is a front elevational view of FIG. 4 showing one proposed appliance in an in-use position.

Figure 6:
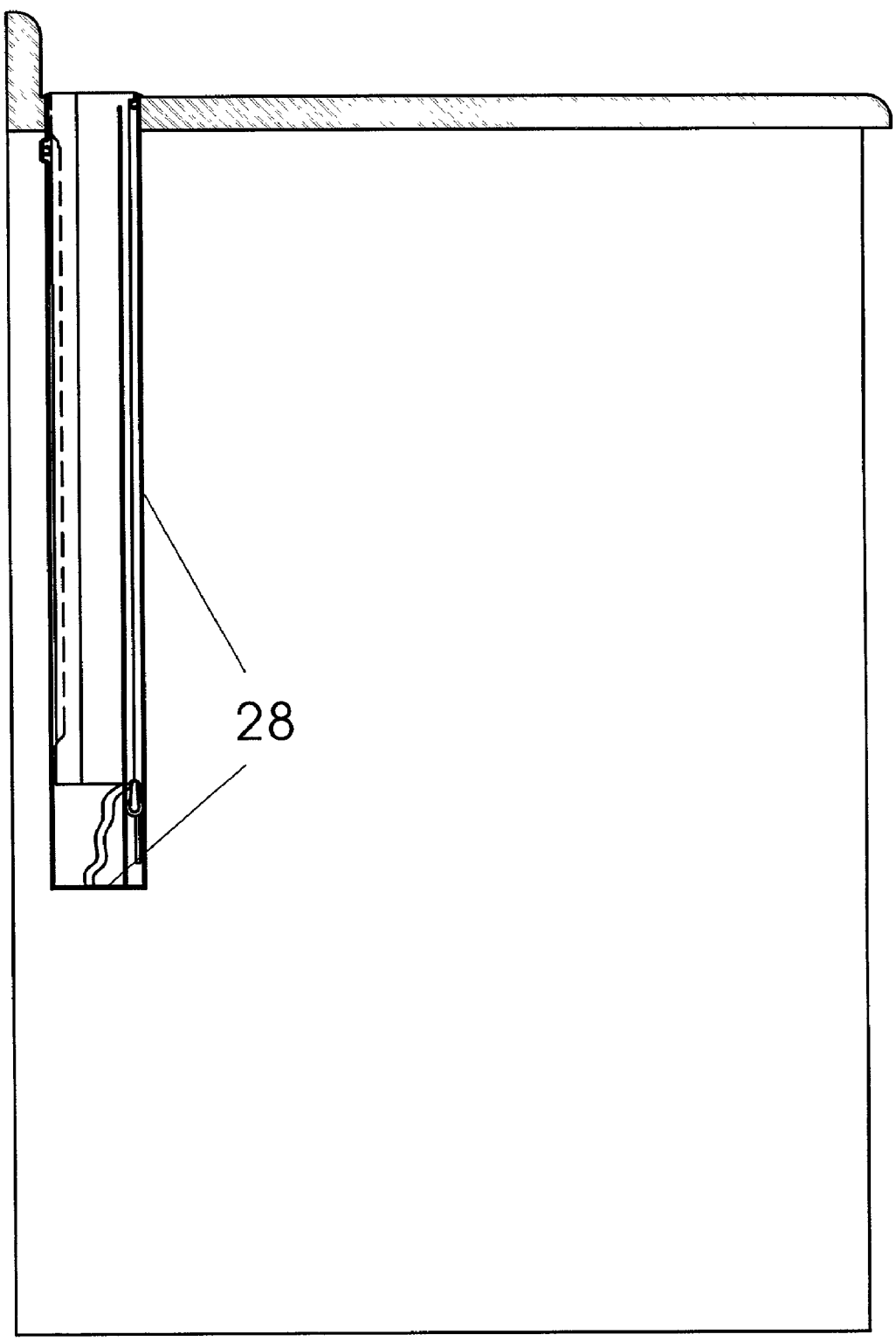
FIG. 6 is a schematic sectional view B—B of FIG. 4, which is of the typical kitchen arrangement with one embodiment of the invention in place, showing the appliance in an out of use position.

FIG. 6 is a schematic sectional view along sectional cutting line B—B of FIG. 4, showing the appliance in an out of use position. Item 28 marks two possible locations for a clean out access hatch or door. Access of some kind would be desirable in the event something fell into the sleeve, 18, and as regular housekeeping of kitchen crumbs and the like.

Figure 7:
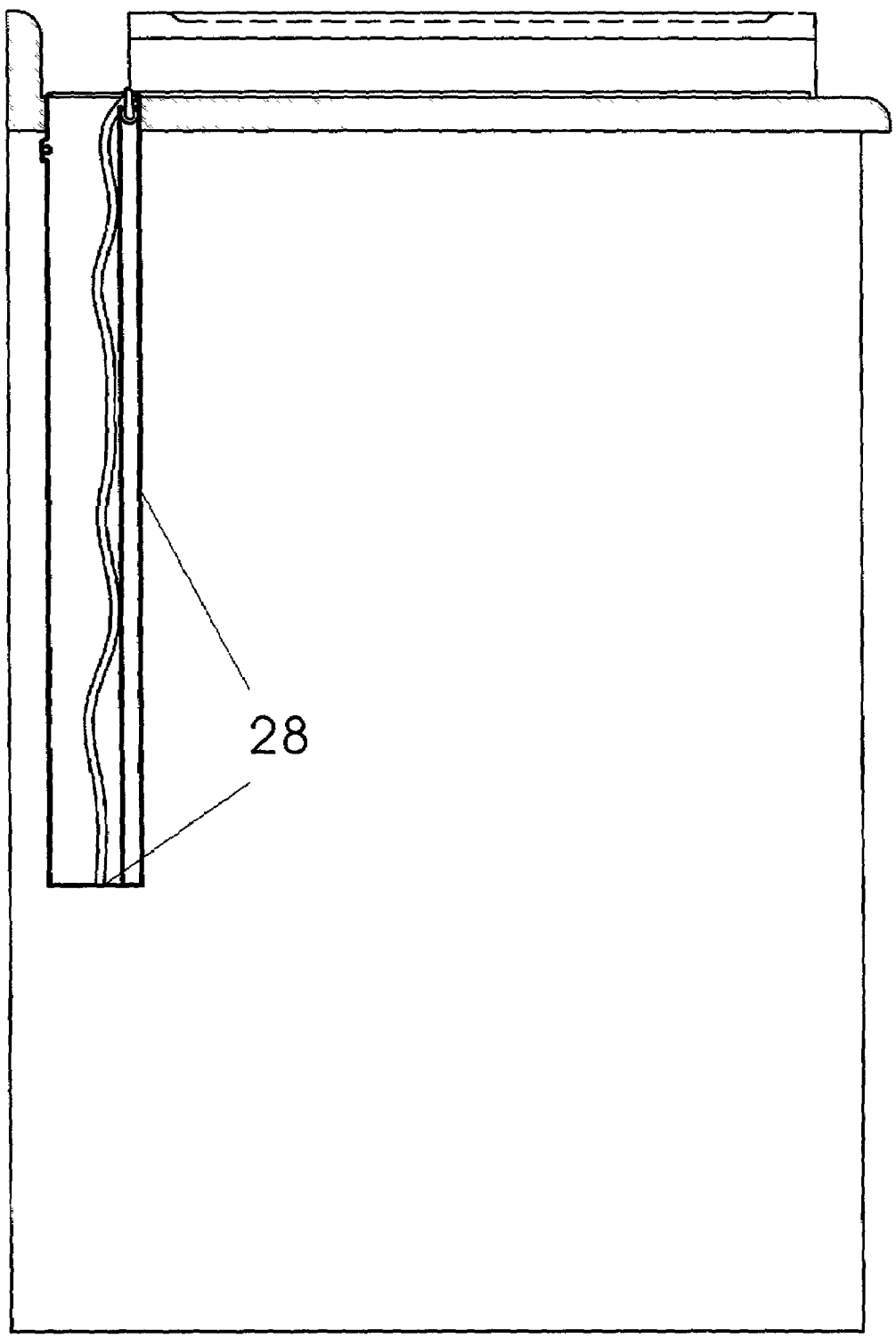
FIG. 7 is a schematic sectional view B—B of FIG. 4 which is of the typical kitchen arrangement with one embodiment of the invention in place, showing the appliance in an in use position.

FIG. 7 is a schematic sectional view B—B of FIG. 4, showing the appliance in an out of use position. It is desirable to have the cooking surface 14, removable from the rest of the appliance to enable it to be cleaned separately. It could be secured to the base unit through a variety of latching arrangements. Additionally, in this way, more then one type of complimentary cooking surface could be used with the same base unit. An example of one such complimentary device is a grilling surface interchangeable with a griddle.

Figure 8:
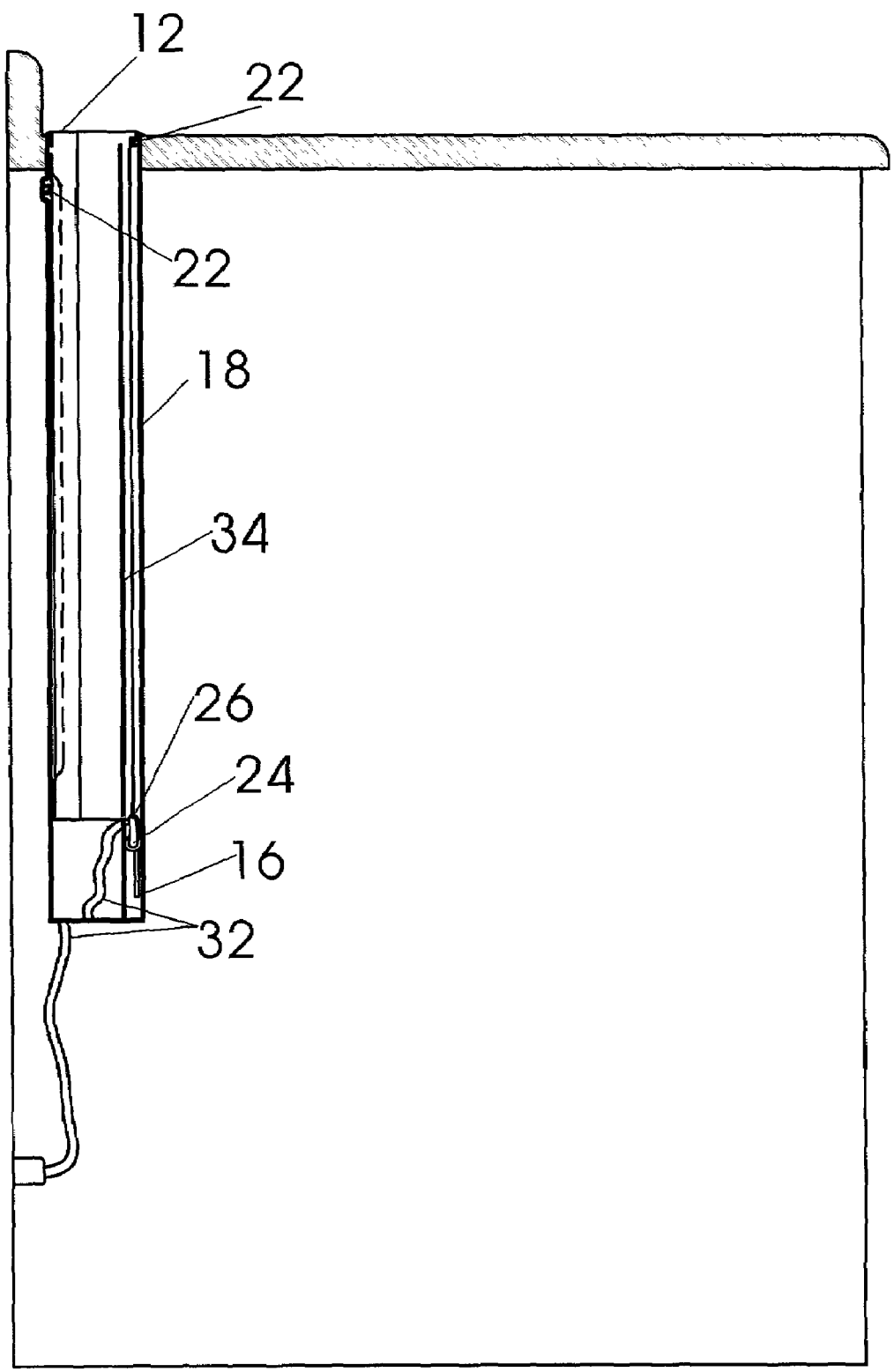
FIG. 8 is a schematic sectional view B—B of FIG. 4, which is essentially the same as FIG. 6, but enlarged to show detail, with one embodiment of the invention in place, showing the appliance in an out of use position.

FIG. 8 is a schematic sectional view along sectional cutting line B—B of FIG. 4 which is essentially the same as FIG. 6, but enlarged to show detail, with one embodiment of the invention in place, showing the appliance in an out of use position. Guide wheels 22, and 24 are used to guide the tracking of the appliance vertically, and in this case, the pivot 26 allows the unit to swing into its final in use position. Although guide wheels 22 are referred to as being fixed this only refers to their relative position to the mounting sleeve or can. It may be desirable to bias them laterally with a spring or other means so that manufacturing and environmental tolerances can be compensated for. The same is true for guide wheel 24 and its associated pivot 26. Guide wheel 24 is tracked by guide rib 34 which could be formed as part of sleeve 18. Such a sleeve could be formed by commonly known manufacturing processes. Some examples include the stamping/forming of steel, or the injection molding of plastic, or extruded plastic/aluminum. In the illustrations guide wheels are used, however, any of a number of guidance means could be employed. The wheels could be substituted with frictional guide blocks, or an extension drawer-slide assembly, ball bearing or other. Similarly, a wire-form tracking system could be employed. It probably would be appropriate to provide positional switches for disabling the appliance when it is in an out of use position.

Such a switch could be a simple pushbutton switch that is tripped into an on position when the appliance is in an in-use position. Another is one that is positonally dependant such as a mercury switch or other form commonly used to avoid fires etc. in appliances such as portable heaters. In the illustration electrical connections are made through electrical conduit 32, however, it may be desirable to employ other methods of electrical connection. One such method would be to provide conductor interface, attached to the appliance that would only make connection with a mating conductor of the sleeve assembly when the appliance was in its in use position. In this way the cord would be eliminated, and the switching issue would be addressed.

Figure 9:
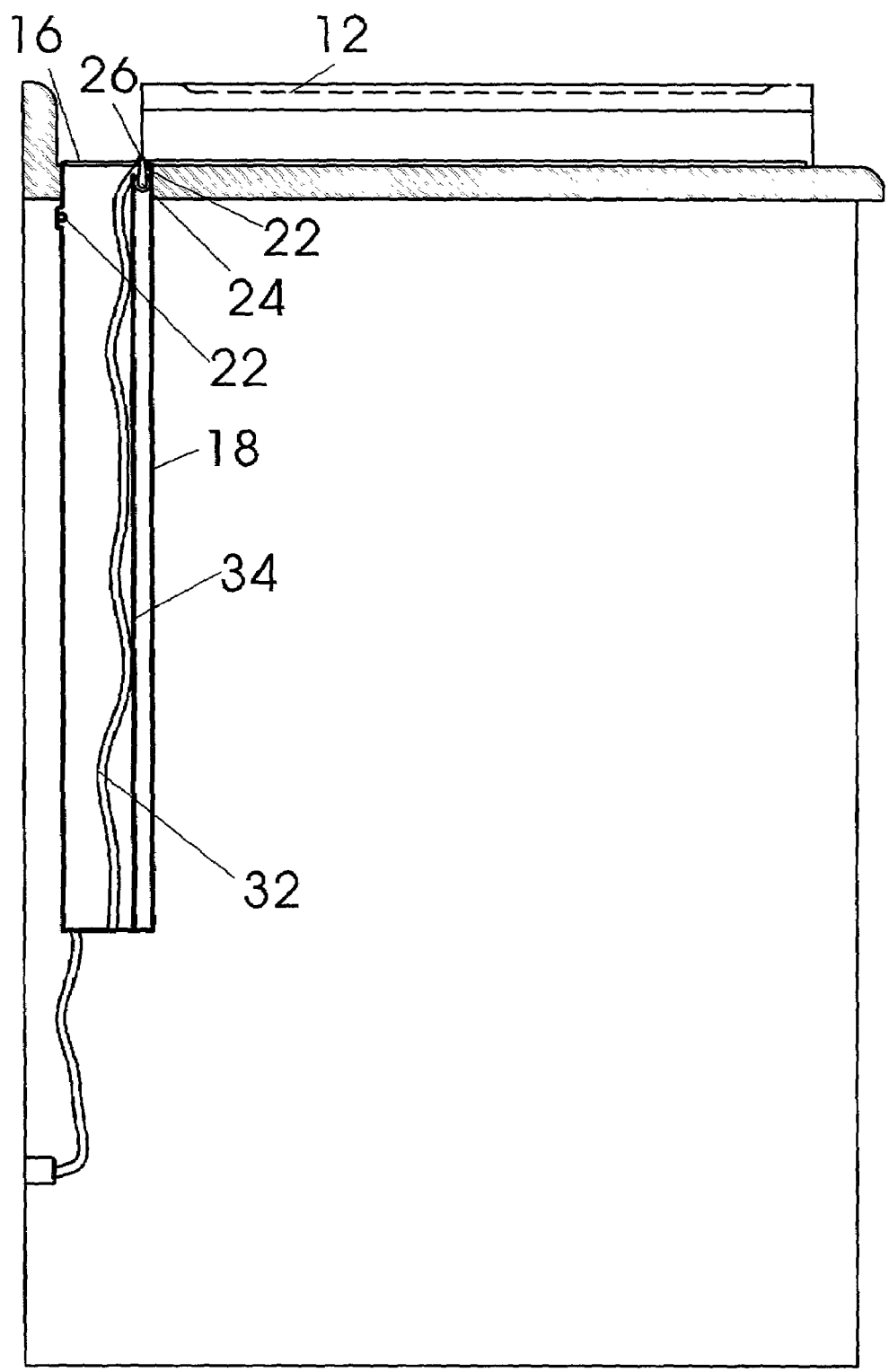
FIG. 9 is a schematic sectional view B—B of FIG. 4 which is essentially the same as FIG. 7, but enlarged to show detail, with one embodiment of the invention in place, showing the appliance in an out of use position.

FIG. 9 is a schematic sectional view B—B of FIG. 4 which is essentially the same as FIG. 7, but enlarged to show detail, with one embodiment of the invention in place, showing the appliance in an out of use position. Of note is that the cover 16, has moved into an appropriate position to cover the hole of the sleeve. Such a cover is not a necessity of the invention, however, it provides a finished look and enhances the safety of the user, and keeps debris etc. from entering the sleeve. It should be noted that with an appropriate exhaust fan arrangement the mounting sleeve 16, could serve as ducting for an exhaust fan. In this case the rectilinear hole of the sleeve may be left open, or the cover 16 may be louvered to allow the appropriate movement of air. It also should be noted that the sleeve itself is not a necessity of the invention, but only serves to fully contain the appliances when stored, or additionally serve as an air-duct. The present illustrations show that the rectilinear hole is covered, in an out of use position, by the top face of the appliance, and then when the appliance is in its in use position by a tail cover 16. This does not have to be the case though. As previously mentioned, it could be advantageous, in some or all instances, to make the cover as a separate entity that opens in some fashion to allow the appliance to move to its in use position.

Figure 10:
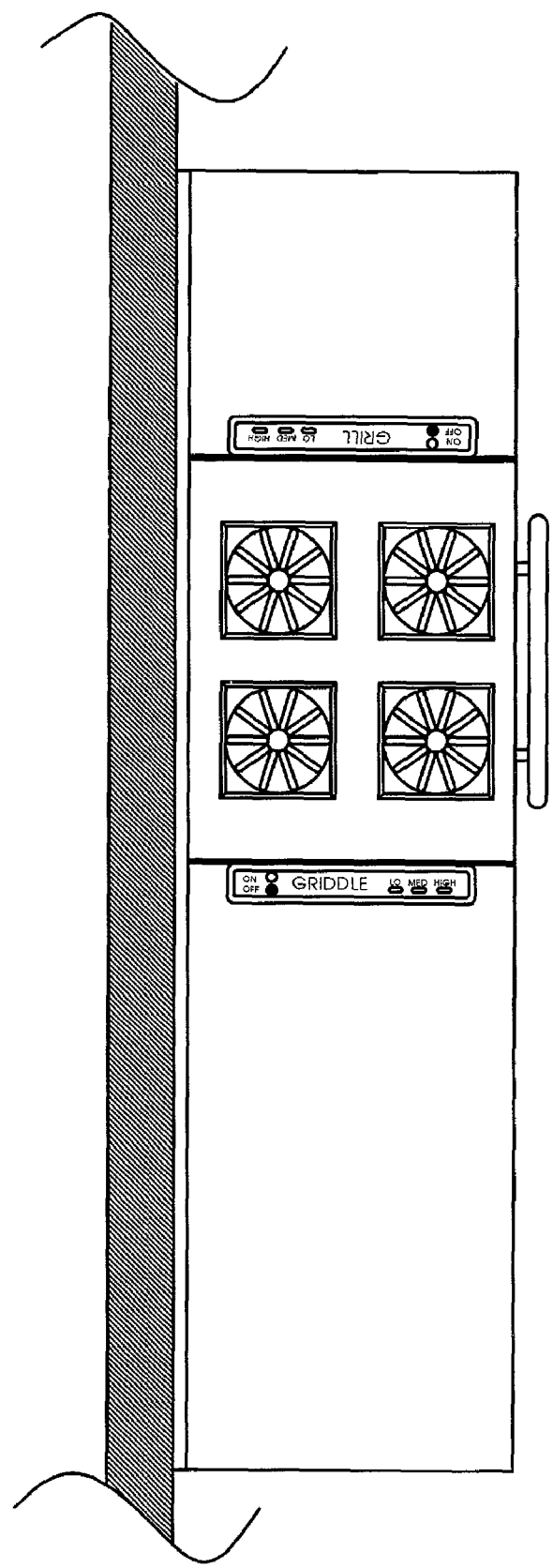
FIG. 10 is a schematic top elevational view of the typical kitchen arrangement showing orientations of the invention in place, in an out of use position.

Referring to FIG. 10 a schematic top elevational view showing alternate orientations of the invention in place, in an out of use position can be seen. This view and FIG. 11 simply illustrate that the invention can be used in several alternate positions. Additional positions are possible such as in front of or in back of a countertop installed cook top. The wide variety of positions should be appreciated, especially when the wide variety of counter/worksurface formats such as islands, sinks, etc. are contemplated.

Figure 11:
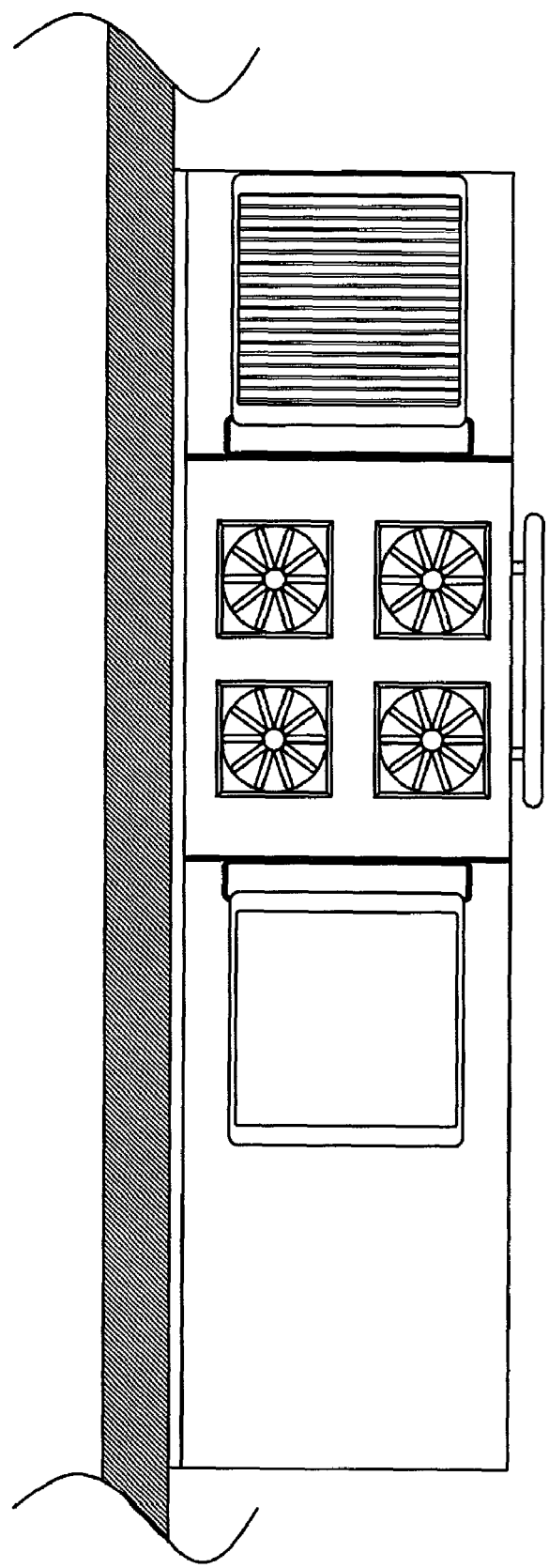
FIG. 11 is a schematic top elevational view of the typical kitchen arrangement showing orientations of the invention in place, in an in use position.

Referring to FIG. 11 a schematic top elevational view showing the alternate orientations of FIG. 10, in an in use position can be seen.

Figure 12:
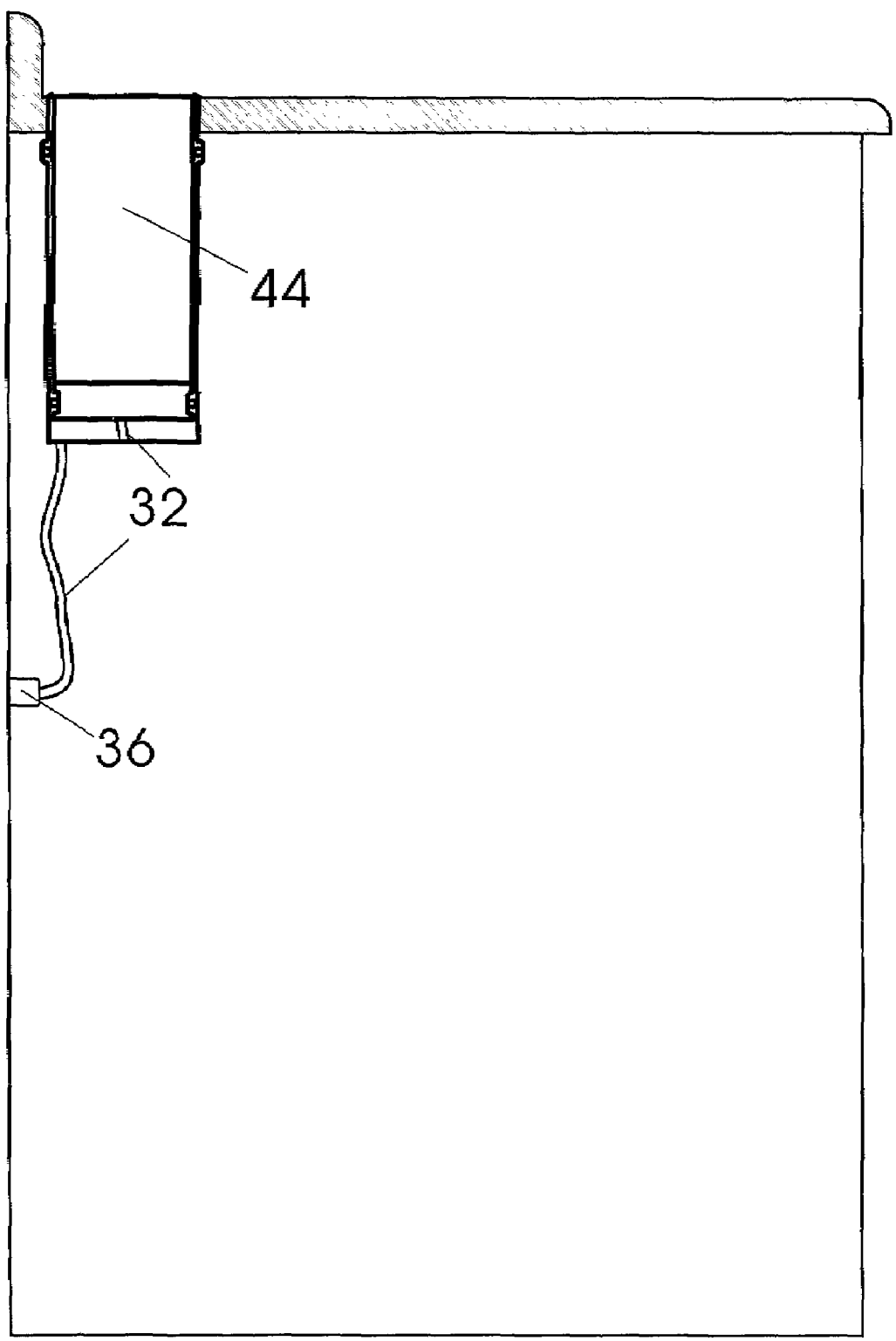
FIG. 12 is a schematic sectional of another embodiment of the invention. The sectional view is similar in orientation to section cutting line B—B of FIG. 4, showing the appliance in an out of use position.

Referring to FIG. 12 is a schematic sectional of another embodiment of the invention. The sectional view is similar in orientation to section cutting line B—B of FIG. 4, showing the appliance in an out of use position. The primary difference with this embodiment is that the appliance contemplated is one that only requires vertical movement to transfer it from an out of use position to an in position. Examples of such appliances are toasters, coffeemakers etc. Note that the in FIGS. 12 and 13 the appliance itself 44, is indicated only generally as a sectioned wall, with a hollow, rectilinear cavity. All applicable contemplated alternatives previously mentioned, such as covers, venting, tracking, and spring/motor biasing are equally applicable to this and all the contemplated embodiments. Also shown is that the unit may be plugged into a standard outlet provided for, preferably, within the cabinet via standard electrical plug 36, and electrical conduit 32. This is an alternate electrification method to what is commonly referred to a hard wiring an appliance. Either of these methods of making electrical connections are applicable to all embodiments of the invention where applicable.

Figure 13:
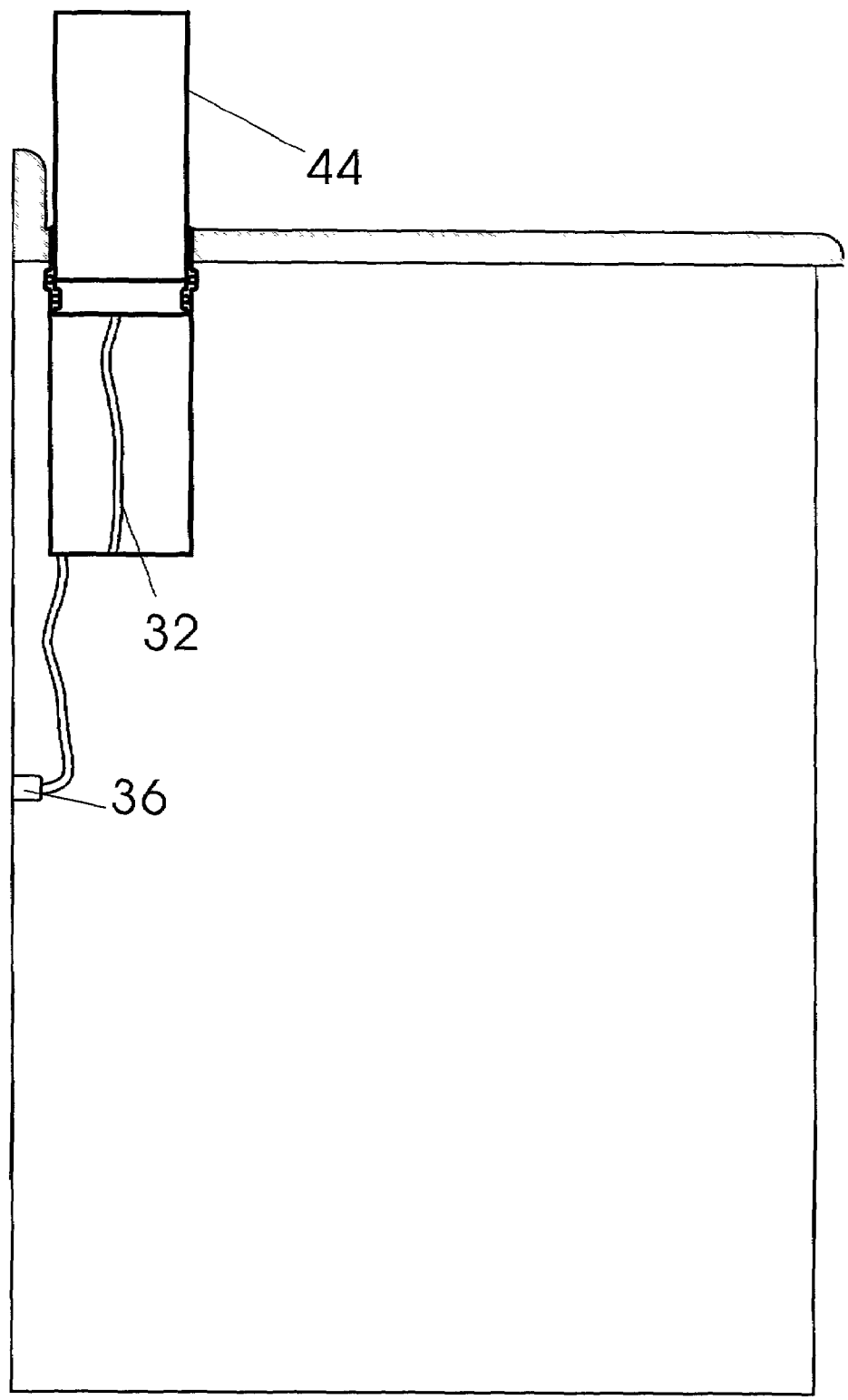
FIG. 13 is a schematic sectional of another embodiment of the invention. The sectional view is similar to that of FIG. 12 but shows a proposed appliance in an in use position.

Referring to FIG. 13 is a schematic sectional view similar to that of FIG. 12, but shows a proposed appliance in an in use position. Again, as with previous embodiments, several modes of operation are contemplated for bringing the unit from an out of use position to an in use position.

Figure 14:
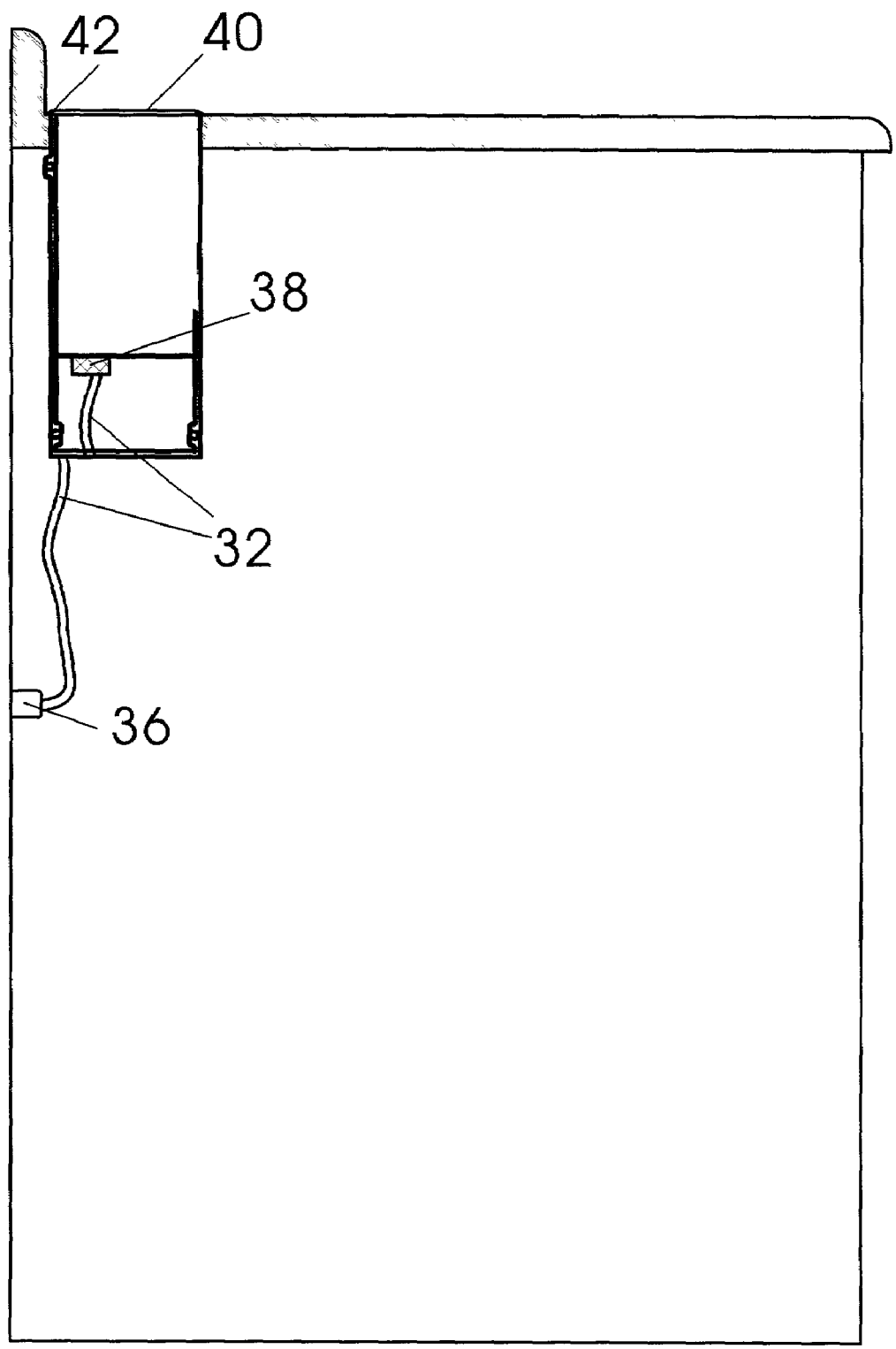
FIG. 14 is a schematic sectional of another embodiment of the invention. The sectional view is similar in orientation to section cutting line B—B of FIG. 4, showing an appliance carrier in an out of use position.

Referring to FIG. 14 is a schematic sectional of another embodiment of the invention. The sectional view is similar in orientation to section cutting line A—A of FIG. 3. This embodiment is substantially the same as that of FIGS. 12 and 13 in that predominately vertical movement is contemplated. The primary difference is that instead of moving an integrated appliance, an appliance carrier is disclosed that is capable of accommodating a variety of manufactured appliances. Note that in FIGS. 14 and 15, no appliance is illustrated. An outlet interface indicated generally by 38, provides a standard outlet, which is suitable for electrifying an appliance that is equipped with a matching plug. In this case, the safety switching scenarios previously set forth could control the electrification of outlet 38, to prevent the appliance from being powered in an out of use position. This figure also shows one alternate cover form that is applicable to all embodiments of the invention. The cover 40, includes a pivot 42, which enable the cover to move into a position allowing the carriage or appliance to move to an in use position.

Figure 15:
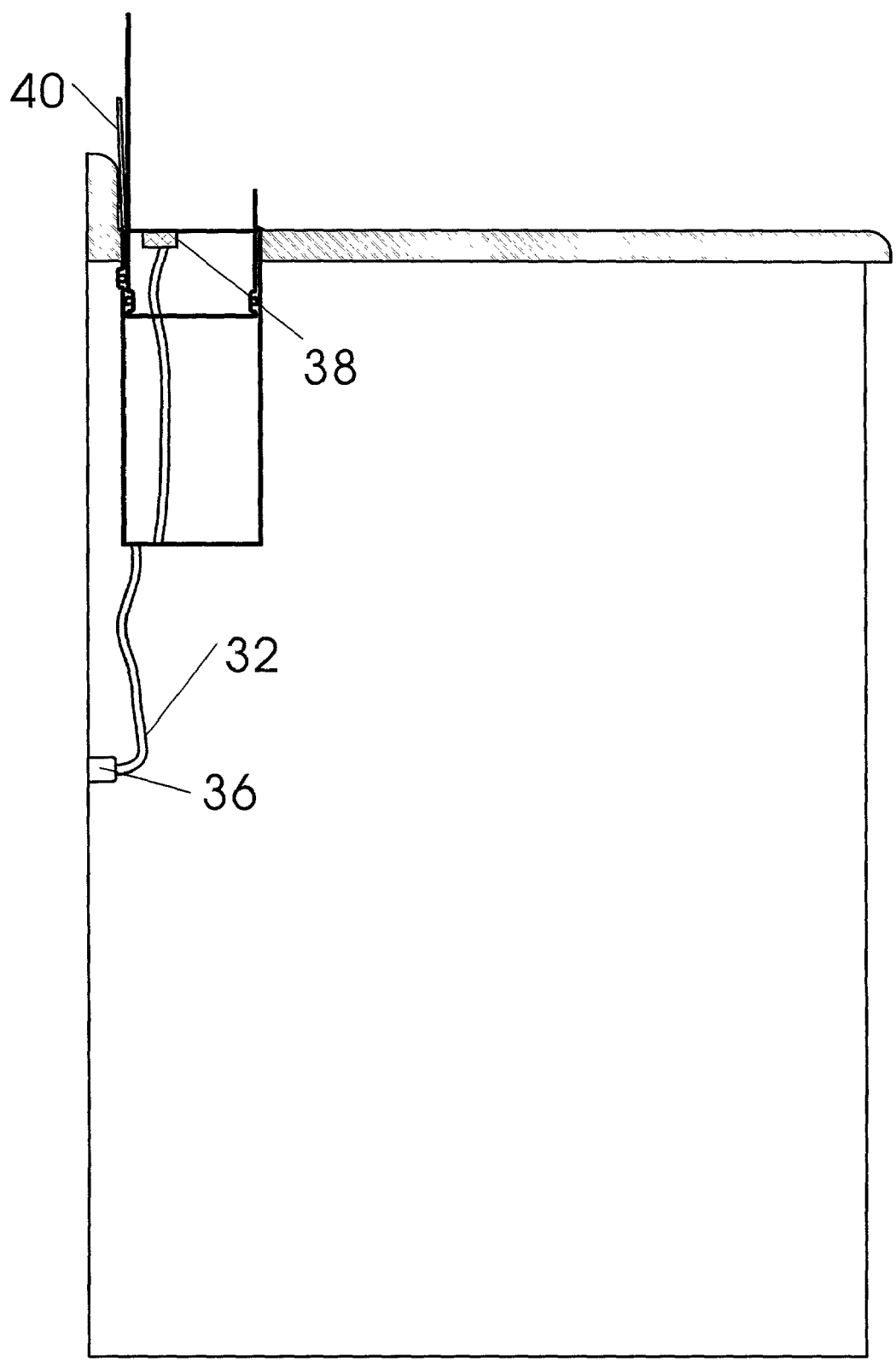
FIG. 15 is a schematic sectional of another embodiment of the invention. The sectional view is similar to that of FIG. 14 but shows a proposed appliance carrier in an in use position.

Referring to FIG. 15 is a schematic sectional of the embodiment of FIG. 14 but shows a proposed appliance carrier in an in use position. In this view the cover 40, can be seen in its open position.

Figure 16:
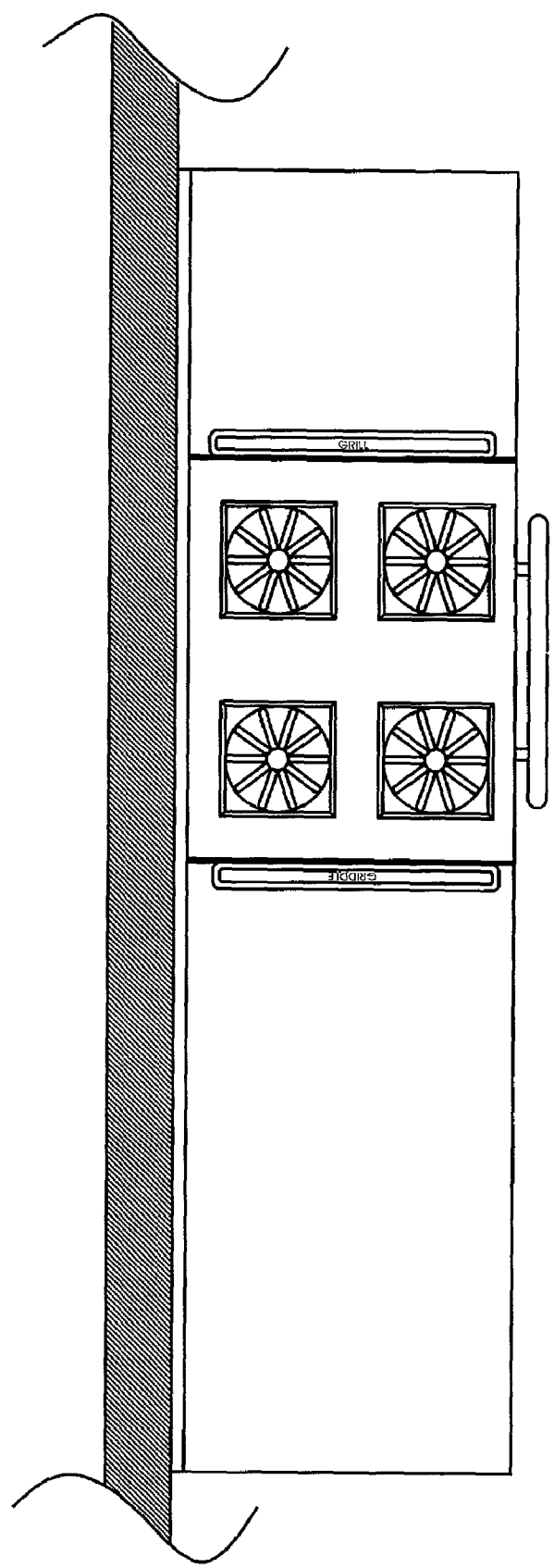
FIG. 16 is a schematic top elevational view of another embodiment of the invention of a typical kitchen arrangement showing orientations of the invention in place, in an out of use position.
Figure 17:
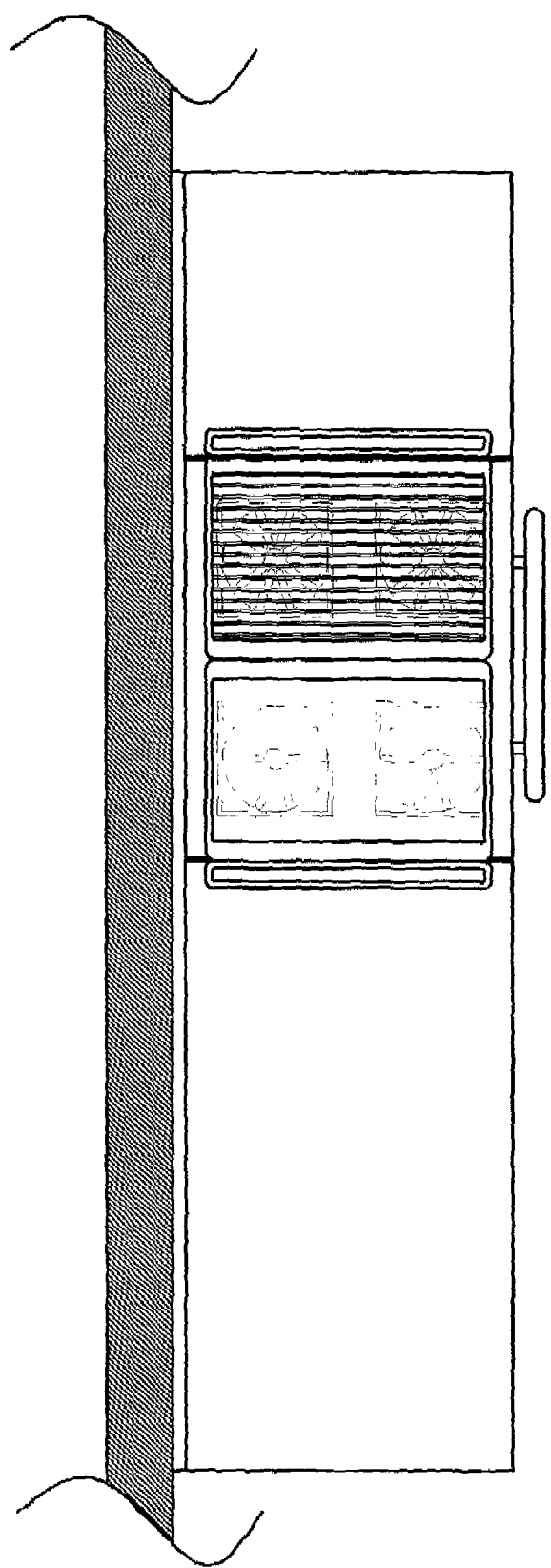
FIG. 17 is a schematic top elevational view of the typical kitchen arrangement illustrating the embodiment of FIG. 16, in an in use position.

Referring to FIG. 16 is a schematic top elevational view of another embodiment of the invention of a typical kitchen arrangement showing orientations of the invention in place, in an out of use position. The difference between this embodiment and all that have preceded, is that in this scenario non-powered kitchen utensils are contemplated. They are to be used with a separate heating surface. This is made clear by referring to FIG. 17 which is a schematic top elevational view illustrating the embodiment of FIG. 16, in an in use position. Note that the burners are hidden and thus illustrated as hidden lines. As previously described, the utensils can be releasably connected to a carrier so that they may be cleaned at a different location. Additionally, this embodiment shares and contemplates all of the applicable alternatives previously set forth concerning other embodiments.

Thus, a new and novel product or system for the storage and retrieval of food preparation appliances, devices and other utensils has been described. The system allows the workplace to remain uncluttered, while allowing the consumer ready access to the appliances, devices or utensils when desired. Additionally, the appliances are stored with the cavities in a more efficient manner than is currently available.

I claim:

1. A device carrier to be used with a work surface, the device carrier comprising:
    a. a generally vertical tracking means;
    b. said tracking means oriented with said work surface so that a first end of said tracking means is at a plane generally aligned with said work surface, and a second, distal end opposite said first end of said tracking means is at a plane generally below said work surface;
    c. a food preparation device to be used with said carrier;

d. an attachment means, so that said food preparation device is attachable and detachable to said carrier;

e. and a pivot associated with said device carrier and said tracking means, whereby said device carrier may be moved from an out of use position below said work-surface into an in use position relative to said work-surface, by said device carrier first moving in a generally vertical motion, and then pivoting about said pivot into its final in use position.

2. The device of claim 1, where said in use position is generally parallel to said work surface.

3. The device of claim 2, where said work surface is a cook top-hob.

4. The device of claim 1, where said carrier is in electrical communication with said vertical tracking device through conduit contiguous to the two.

5. The device of claim 1, where said food preparation device further includes a resistive heating element.

6. The device of claim 1, where said tracking means is disposed within a sleeve structure.

7. The device of claim 6, where said sleeve structure further includes at least one opening intended to be generally aligned with said work surface.

8. The device of claim 7, where said opening and said sleeve structure cooperate to function as an air-duct.

9. The device of claim 6, where said sleeve structure further includes an access cover member located at a position distal to that of said work surface.

10. The invention of claim 1, whereby said attachment means enables a plurality of said food preparation devices to be interchangeably used with said carrier.

11. A food preparation device to be used with a work surface, the device comprising:

a. a generally vertical tracking means;

b. said tracking means oriented with said work surface so that a first end of said tracking means is at a plane generally aligned with said work surface, and a second, distal end opposite said first end of said tracking means is at a plane generally below said work surface;

c. a means of electrifying said food preparation device;

d. a pivot means associated with said device, and said tracking means, whereby said food preparation device may be moved from an out of use position below said work-surface into an in use position relative to said work-surface, by said food preparation device first moving in a generally vertical motion, and then pivoting about said pivot into its final in use position.

12. The invention of claim 11, further including attachment means so that said food preparation device is removable from said tracking means and so that also a plurality of said food preparation devices may be interchangeably used with said tracking device.

13. The device of claim 11, where said in use position is generally parallel to said work surface.

14. The device of claim 11, where said food preparation device further includes a resistive heating element.

15. The device of claim 11, where said carrier is in electrical communication with said vertical tracking device through conduit contiguous to the two.

16. The device of claim 11, where said tracking means is disposed within a sleeve structure.

17. The device of claim 16, where said sleeve structure further includes at least one opening intended to be generally aligned with said work surface and said opening and said sleeve structure cooperate to function as an air-duct.

18. A food preparation device carrier to be used with a work surface, the device comprising:

a. a means of supporting said device carrier below said work-surface;

b. a generally vertical tracking means associated with said device carrier so that said device carrier can be moved from an out of use position below said work-surface into an in use position relative to said work-surface;

c. a sleeve structure having an open end generally planer with said work surface that defines a chamber capable of housing said vertical tracking means and said device carrier when not in use, where said chamber is further defined by at least three, generally solid, vertical walls and one, generally solid, horizontal wall distal to said open end of said sleeve structure and where said sleeve structure further includes an access means located at a position generally distal to that of said work surface.

19. The device of claim 18, further including a food preparation device associated with said carrier.

20. The device of claim 18, where said food preparation device further includes a resistive heating element.

* * * * *